United States Patent Office 3,264,088
Patented August 2, 1966

3,264,088
SLOW RELEASE FERTILIZER GRANULE HAVING A PLURALITY OF EPOXY RESIN COATINGS
Louis I. Hansen, Minneapolis, Minn., assignor to Archer-Daniels-Midland Company, Minneapolis, Minn., a corporation of Delaware
No Drawing. Filed Dec. 8, 1965, Ser. No. 512,524
7 Claims. (Cl. 71—64)

This is a continuation-in-part of Serial No. 132,383, filed August 18, 1961, now U.S. Patent 3,223,518.

The present invention relates to coated fertilizers and to the preparation thereof. In one aspect, the present invention relates to fertilizer products comprising a core of fertilizer (e.g., in granular, pelletized or prilled form) which is surrounded by a plurality of water insoluble coatings. These coatings delay and effect a slow and gradual release of the water soluble plant nutrients contained in the fertilizer. These coatings also facilitate handling and storage of the fertilizer. Typically, these coatings each amount to from about 0.1 to 5% by weight based on the weight of the core.

Aside from the dusting and caking problems frequently associated with the use of ordinary fertilizers, one of their major disadvantages is that they are leached too rapidly into the soil. This rapid leaching causes plants to be burned. As a result, care must be taken to avoid excessively heavy applications of fertilizer (to thereby prevent burning). To do this frequently necessitates several applications of fertilizer throughout a growing cycle. Further, the rapid leach rate of ordinary fertilizers has also been known to cause plants to grow in spurts. Thus, an abnormally high growth rate frequently follows a fertilizer application. This growth rate diminishes rapidly as the fertilizer is depleted. Throughout successive applications of fertilizer, this cycle of high growth rate followed by a rapid diminishing of the growth rate is apparent. Further, the high leach rate associated with common fertilizers also causes water soluble plant nutrients to be lost since they are made available to plants faster than the plants can utilize them.

Consequently, it is desirable that fertilizer products be provided which offer a metered or gradual release of the water soluble fertilizer components to thereby provide a uniform rate of growth. Such a slow release fertilizer would also offer the advantage that larger amounts of fertilizer could be included in any given application. Thus, the necessity for subsequent applications could be substantially reduced or even eliminated entirely. Moreover, the losses of fertilizer associated with high leach rates could be avoided.

Various attempts have been made to develop anticaking fertilizers, dust-free fertilizers, and to a lesser extent, slow-release fertilizers. For example, the use of materials such as stearic acid or diatomaceous earth, have been reported as assisting the free-flowing and non-caking qualities of fertilizer granules without providing a metered release of the soluble components of the fertilizer.

I have discovered, and this discovery forms a basis for the present invention, that an effective slow-release fertilizer can be prepared by encapsulating or coating fertilizer with epoxy resins. Epoxy resins, when applied in film-form on fertilizer granules and then cured, provide a water-insoluble coating around the fertilizer and perform a metering function which delays and effects the slow and gradual release of water-soluble components contained in the fertilizer. This slow rate of release can be controlled to provide a substantially uniform rate of release over extended periods of time. Typically, a high analysis fertilizer (e.g., 10–10–10) is encapsulated with a plurality of these coatings to provide a slow-release fertilizer which minimizes leaching losses, prevents plant overfeeding, and the like. During use, the coating or shell which surrounds the core of fertilizer has been noted to remain intact.

The present invention is applicable to both organic and inorganic fertilizers which contain water soluble plant nutrients. Such fertilizers contain plant nutrients, frequently in the form of water soluble salts of such elements as carbon, nitrogen, oxygen, phosphorus, sulfur, potassium, calcium, magnesium, manganese, zinc, copper, boron, chlorine, and the like as well as other trace elements (reference is made to the Yearbook of Agriculture, U.S.D.A., 1957, page 81). Especially well adapted to the present invention are the commercially produced inorganic fertilizers containing nitrogen, phosphorus and potassium. These are generally prepared as heterogeneous granules, prills, and the like. The present invention is also applicable to such single component fertilizers as ammonium nitrate, urea, potassium chloride, and the like. Common fertilizers designated as 8–24–12, 8–8–6, 5–20–20, 12–12–12, 14–16–0, 4–8–6, 3–9–6, 39–0–0, 9–39–0, 10–10–10, 20–10–5, 0–46–0, and the like, are well suited for use in the present invention. All of these fertilizers may optionally contain supplementary additives such as trace elements, iron salts, insecticides, herbicides, fungicides, and the like. Further, the plant nutrients may be impregnated on or admixed with inert materials, e.g., silica, coke, and the like.

As previously indicated, the coating or film-forming materials used to encapsulate fertilizer according to the present invention, are epoxy resins. These resins are commonly produced by the reaction of epoxy compounds (e.g., epichlorohydrin) with dihydric phenols (e.g., Bisphenol-A) to give glycidyl ethers, and are known commercially as Epi-Rez, Araldite, Epon, etc., resins. These resins are well known and their preparation forms no part of the present invention. The phenols which are used to form epoxy resins must be at least dihydric. Possible phenols include catechol, resorcinol, hydroquinone, pyrogallol, and phloroglucinol. However, these phenols are all relatively scarce and expensive. The phenol usually employed for the manufacture of epoxy resins is known as Bisphenol-A, and is made by the condensation of acetone with phenol. Of the many epoxy compounds possible, the one principally used, because of its availability and cost, is epichlorohydrin. The reaction between the epoxy compounds and the phenols to thereby form epoxy resins is well understood in the art (see for example, U.S. 2,521,911).

The epoxy resins used to coat fertilizer according to this invention will contain terminal epoxide groups. Those skilled in the art will recognize that some of the commercially available epoxy resins are normally liquid, while others are normally viscous to solid. Although all of these resins can be cured by known techniques, I prefer to employ those resins which are normally liquid as well as those which can be made liquid by the use of a solvent at a non-volatile content of at least 30 weight percent. Preferably, the viscosity of epoxy resins used according to the present invention should be no higher than $Z_1$ on the Gardner-Holdt scale when used as a 40 weight percent solution in butyl carbitol at 25° C. While these resins can have epoxide equivalents ranging from about 100 up to 4,000, I prefer to employ those resins having an epoxide equivalent below 500. The epoxide equivalent is defined as the number of grams of a particular resin which contains one gram-equivalent of the epoxide. If desired, epoxidized compounds of other types can be blended with these epoxy resins to obtain various modifications in performance.

These epoxy resins contain both epoxide and hydroxyl groups which can serve as the points of reaction with curing agents and modifying resins. The chemical activity of the liquid, low-molecular weight resins is due primarily to the epoxide groups, while the high-molecular weight resins, having a lower relative amount of epoxide groups, react primarily through the hydroxyl groups. The intermediate resins exhibit both epoxide and hydroxyl group activity. Of the various organic nitrogen compounds which have been suggested as epoxy resin curing agents, aliphatic and aromatic amines are probably the most useful. Generally, primary amines are more effective than secondary and tertiary amines. Polyfunctional aliphatic amines, such as diethylene triamine, are very effective and react rapidly at room temperature to form highly cross-linked structures. Elevated temperatures are usually necessary to obtain optimum cure with aromatic amines. Complex or adduct amines can also be used as curing agents. These curing agents are prepared by, for example, the reaction of two moles of a polyamine with one mole of an epoxy resin. Among the advantages of the complex amines are lower toxicity, ease of handling, and improved flow. The Versamid resins, like the amine adducts, were also developed as curing agents to overcome the volatility and toxicity problems of the simple polyamines. Likewise, dibasic acid anhydrides can be used as curing agents. More recently, carboxyl terminated polyester resins have been developed which are effective curing agents for the epoxy resins. Still other curing agents for epoxy resins are the mercaptan-terminated saturated type of elastomer (liquid Thiokols). Still another method of curing epoxy resins is by reaction with aminoplasts and phenoplasts.

When coating fertilizer according to the present invention, an epoxy resin (or a mixture of epoxy resins) and a suitable curing agent (or mixture thereof) are mixed. Frequently, it is desirable to include solvent in this mixture to facilitate its application in film form to the fertilizer to be coated. Rapid drying solvents are required since it is necessary to ultimately remove the solvent from the wet films (which have been applied to the fertilizer) without heating the fertilizer to a point at which decomposition takes place. The selection of suitable solvents is a task within the skill of the art. The amount of curing agent which is used will vary, depending upon the choice of curing agent. Again, suitable curing agents are already known to the art and the selection of a suitable curing agent, together with the selection of suitable proportions, are acts within the skill of the art. If desired, the mixture of epoxy resin and curing agent can additionally contain pigments, dyes, driers, stabilizers, and the like. It is this mixture of epoxy resin and curing agent which is applied in film form to the fertilizer to be coated.

In coating fertilizers according to the present invention, I have found that substantial benefits are obtained when a plurality of coatings are employed, as opposed to a single coating. I have found that a single coating, regardless of amount, is generally inferior to a plurality of coatings of the same type, when the same total coating weight is employed. Although each of the coatings (considering the combined weight of curing agent and epoxy resin, both on a 100% solids basis) can range from at little as, for example, 0.1 percent up to 10 percent or more, based on the weight of the core, I have found that individual coating weights of from 0.2 to 4 percent, on the same basis, are particularly well suited for the practice of my invention. Commonly, I apply a plurality of coatings of an epoxy resin to a granular fertilizer, each in the amount of about 0.25 to 3 percent (on the same basis) and repeat these applications until the total coating weight is sufficient to provide a desired rate of release of the water soluble components contained in the fertilizer. Typically, the total weight of these coatings will be from 2 to 20 percent, more usually from 3 to 15 percent, based on the weight of the uncoated fertilizer. The total coating weight is also a function of the particle size of the fertilizer to be coated, the surface area of the fertilizer particles, the smoothness of the fertilizer particles, etc.

It should be noted that each of the coatings employed by me will not always appear as a separate, discrete coating on the final product. Further, in applying these coatings, any particular coating may not, by itself, completely encapsulate the core of fertilizer material. However, the combined effect of the plurality of coatings employed by me is to completely surround or encapsulate the core of fertilizer material with a water insoluble skin. When one realizes that I employ at least two coatings, and preferably more coatings, the degree of encapsulation and film integrity obtained by me can be appreciated. Fertilizer products prepared according to my invention are completely encapsulated or surrounded with a water-insoluble film. When the total amount of coatings is applied in the form of a plurality of thin films (this is preferable), I prefer to employ at lease three and preferably six or more individual coatings.

In coating fertilizer granules, I frequently use the epoxy resins in the form of a rapid drying solvent solution. Improved results are obtained if the fertilizer granules are pre-heated to, for example, 100° to 300° F. Each successive coating or layer should be dried at least to the point of incipient gelation so that it is not loosened or lifted by the subsequent wet coatings. I have found that tumbling and gently cascading the fertilizer granules together as the wet coatings are dried improves the rate of drying, improves film integrity, and assists in completely encapsulating the fertilizer. Agglomeration is also avoided and product durability is improved. Tumbling also helps spread the resin over the surface of the fertilizer granules by a rubbing or smearing action. When the final coating has been applied, the plurally coated fertilizer is then dried and cured to a tack-free state. The final product must be tack-free to avoid compaction and agglomeration problems. The net result is a fertilizer product comprising a core of fertilizer material surrounded by a plurality of cured coatings. These coatings provide a water insoluble shell or shield around the fertilizer and allow for the gradual release of water soluble plant nutrients, apparently as a result of osmotic action.

While this invention has been described with reference to a particular coating material, it is to be understood that I contemplate that the coating materials of this invention could be used in conjunction with other coating materials. Thus, where granules having a highly irregular surface are to be coated, I would suggest that this surface be treated in some fashion (e.g., as by pre-coating the granules) to thereby form smoother granules. In this manner, it is possible to reduce the amount of the more expensive coating material which is required to obtain the same degree of encapsulation, film integrity, and the desired rate of release. Similarly, over-coatings can be utilized to provide better eye appeal, and the like. In any event, it is to be understood that my invention involves providing a granular fertilizer with a plurality of coatings of the particular coating material herein described.

The present invention will be further understood by reference to the following specific examples which include a preferred embodiment. Unless otherwise indicated, all parts and percentages are by weight. In these examples, the equipment used for coating the fertilizer was a horizontally mounted drum about 36 inches long and 16 inches in diameter. Means were provided to allow hot air to be passed axially through the drum. The air flow rate could be varied from about 100–500 c.f.m. Typically, the air flow rate was about 200–350 c.f.m. An open gas flame was used to pre-heat the air. Although the temperature of the air could be as high as 300° F. or higher, it was usually kept within the range of 140°–250° F. During coating operations, the drum was rotated at a peripheral speed which could be varied from 50 inches per minute to 500 inches per minute. Typically, the speed was about 130–140 inches per minute. Baffles located within the drum were used to reduce the tendency of the fertilizer to ball-up during the coating operation.

Leach rates were determined the following manner: a twenty (20) gram sample of fertilizer was placed in and 8 ounce screw-top bottle and 100 ml. of water was then added. The bottle was sealed and then shaken gently until all the fertilizer granules were wet. The jar was then allowed to stand at room temperature (e.g., 70–75° F.) for a pre-selected period of time (e.g., 24 hours). At the end of this time, the contents of the bottle were again shaken to obtain a uniform solution. The solution was then passed through filter paper to remove undissolved particles, etc. A 5 ml. portion of the filtrate was then dried. The weight of the dry residue (if any) in grams, multiplied by 100 gave the percent of material leached from the fertilizer (based on the total weight of the coated fertilizer before leaching). A temperature of about 200° F. was used for drying the filtrate.

EXAMPLES OF THE COATED FERTILIZER

Example I

A prilled fertilizer (Monsanto's prilled urea, screened to remove prills smaller than 20 mesh) was plurally coated with 12% of epoxy resin in the following manner:

The uncoated fertilizer was placed in the rotating drum and pre-heated to about 160° F. Then each coating or layer was applied by introducing the necessary amount of resin through a long piece of aluminum tubing and spraying the hot, tumbling prills with a thin stream of resin. Simultaneously, hot air (160°–200° F.) was passed through the drum. Nine (9) coatings of epoxy resin were applied; the first amounted to 2% of the weight of the fertilizer, the next four each amounted to 1½% on the same basis, and the remaining four each amounted to 1% on the same basis (all referring to 100% solids and considering the combined weight of resin and curing agent). A ten-twenty-minute interval was allowed between each application of the resin to thereby ensure that the previous coating (in each instance) had dried at least to the point of incipient gelation. After the last coating of resin had been applied, the heat was removed and the hot, coated prills were allowed to tumble (with the air still coming through the drum) until the coated fertilizer prills were tack-free. Then, the coated fertilizer was removed from the drum and tested. The 72-hour leach was 19%.

The epoxy resin used in this example was Epon 815 (80 parts) and the curing agent (20 parts) was the reaction product of epoxidized oleyl nitrile and triethylene tetramine. Epon 815 is a liquid bisphenol-epichlorohydrin resin having terminal epoxide groups and an epoxide equivalent below 500.

Example II

The procedure of Example I is repeated using a granular, high analysis fertilizer (Smith-Douglass 16–8–8). In this example, the epoxy resin is Epon 828 and the curing agent is Versamid 140. Seventy parts of resin and 30 parts of curing agent are used. A total coating weight of 9% is applied as follows: a first coating of 3% followed by six coatings of 1% each. The resulting product is useful as a slow-release fertilizer. Epon 828 is a liquid bisphenolepichlorohydrin resin having terminal epoxide groups and an epoxide equivalent of 175–210.

Example III

The procedure of Example I is repeated exactly except that a solvent (toluene) is included in the mixture of epoxy resin and curing agent. Ten percent toluene is used. The resulting product is useful as a slow-release fertilizer.

Having described the present invention with a certain degree of particularity, it will be realized that numerous minor changes and variations, falling within the spirit and scope of this invention, will become obvious to those skilled in the art. It is not intended that this invention be limited to any of the coating materials which have been mentioned as specific examples nor by any of the specific proportions which have been given for the sake of illustration, but it is intended to claim all novelty inherent to the invention, as well as all obvious modifications and variations thereof.

What is claimed is:
1. A coated fertilizer comprising:
   (a) a core of granular fertilizer containing at least one water soluble plant nutrient;
   (b) a plurality of cured coatings of epoxy resin surrounding said core, said epoxy resin having terminal epoxide groups before curing; and
   (c) the total weight of coatings being from 2 to 20% based on the weight of the core.
2. The product of claim 1 wherein:
   (a) each of said cured coatings amounts to from 0.2 to 4% based on the weight of said core.
3. The product of claim 2 wherein said epoxy resin is a bisphenol-epichlorohydrin resin having an epoxide equivalent of from 100–500.
4. The product of claim 3 wherein at least three of said coatings are present.
5. The product of claim 3 wherein:
   (a) said epoxy resin has an epoxide equivalent of about 175–210; and
   (b) wherein said resin is cured with an amine curing agent.
6. The product of claim 3 wherein said core is granular high analysis, inorganic fertilizer containing at least one water soluble plant nutrient compound of nitrogen, phosphorous, or potassium.
7. The product of claim 3 wherein said core is urea.

UNITED STATES PATENTS

References Cited by the Examiner

| | | | |
|---|---|---|---|
| 1,648,861 | 11/1927 | O'Barr | 23—103 |
| 2,155,499 | 4/1939 | Lawson | 117—100 |
| 2,399,387 | 5/1946 | Cordie | 71—64 |
| 2,502,996 | 4/1950 | Rohner | 71—64 |
| 3,014,783 | 12/1961 | Young | 71—64 |
| 3,158,462 | 11/1964 | Wilson | 71—64 |

DONALL H. SYLVESTER, *Primary Examiner.*

THOMAS KILEY, *Examiner.*